(12) United States Patent
Chen

(10) Patent No.: US 10,701,306 B2
(45) Date of Patent: Jun. 30, 2020

(54) IMAGE DISPLAYING APPARATUS AND IMAGE DISPLAYING METHOD

(71) Applicant: VIVOTEK INC., New Taipei (TW)

(72) Inventor: Yen-Lo Chen, New Taipei (TW)

(73) Assignee: VIVOTEK INC., New Taipei (TW)

( * ) Notice: Subject to any disclaimer, the term of this patent is extended or adjusted under 35 U.S.C. 154(b) by 0 days.

(21) Appl. No.: 16/188,299

(22) Filed: Nov. 13, 2018

(65) Prior Publication Data

US 2019/0158779 A1 May 23, 2019

(30) Foreign Application Priority Data

Nov. 21, 2017 (TW) .............................. 106140377 A

(51) Int. Cl.
  *H04N 7/01* (2006.01)
  *G11B 27/00* (2006.01)
  *G06K 9/00* (2006.01)

(52) U.S. Cl.
  CPC ......... *H04N 7/0127* (2013.01); *G11B 27/005* (2013.01); *G06K 9/00711* (2013.01)

(58) Field of Classification Search
  CPC ......... H04N 21/4307; H04N 21/47217; G11B 27/005

See application file for complete search history.

(56) References Cited

U.S. PATENT DOCUMENTS

| | | | | |
|---|---|---|---|---|
| 5,339,167 A * | 8/1994 | Kuroda | ............... | H04N 5/937 386/221 |
| 5,719,982 A * | 2/1998 | Kawamura | ........ | H04N 21/8455 386/241 |
| 6,356,702 B1 * | 3/2002 | Suzuki | .................. | H04N 5/783 386/200 |
| 6,487,642 B1 * | 11/2002 | Duruoz | ............... | G06F 9/45512 711/145 |
| 6,549,578 B1 * | 4/2003 | Maruya | ............... | H04N 19/174 348/414.1 |
| 7,787,747 B2 * | 8/2010 | Maeda | ................. | G11B 27/005 382/233 |
| 8,265,168 B1 * | 9/2012 | Masterson | ..... | H04N 21/234381 375/240.25 |
| 8,346,049 B2 * | 1/2013 | Yamazaki | .......... | H04N 5/44591 348/564 |

(Continued)

FOREIGN PATENT DOCUMENTS

| | | |
|---|---|---|
| CN | 104519294 A | 4/2015 |
| TW | 201720151 A | 6/2017 |

*Primary Examiner* — Paulos M Natnael
(74) *Attorney, Agent, or Firm* — Winston Hsu

(57) ABSTRACT

An image displaying method capable of automatically adjusting a displaying speed according to content of the image is applied to an image displaying apparatus. The image displaying method includes acquiring video data containing a first group of images and a second group of images, acquiring a first time difference between a first beginning image frame of the first group of images and a second beginning image frame of the second group of images, comparing the first time difference with a predetermined threshold value, and adjusting the displaying speed of the first group of images in accordance with a comparison result. Each group of images is consisted of a beginning image frame and at least one non-beginning image frame.

18 Claims, 4 Drawing Sheets

(56) References Cited

U.S. PATENT DOCUMENTS

| | | | | |
|---|---|---|---|---|
| 8,351,757 | B2* | 1/2013 | Tsunashima | H04N 5/44 386/200 |
| 8,989,551 | B2* | 3/2015 | Yamazaki | H04N 5/44591 348/564 |
| 10,063,735 | B2* | 8/2018 | Chen | H04N 1/2195 |
| 10,075,758 | B2* | 9/2018 | Ayers | G06T 19/006 |
| 2003/0077073 | A1* | 4/2003 | Lin | G06T 9/004 386/346 |
| 2008/0117988 | A1* | 5/2008 | Toma | G11B 27/005 375/240.26 |
| 2008/0279527 | A1* | 11/2008 | Chun | G11B 27/005 386/343 |
| 2008/0292272 | A1* | 11/2008 | Yamazaki | H04N 5/44513 386/244 |
| 2009/0180761 | A1* | 7/2009 | Wand | H04N 5/772 386/329 |
| 2009/0282444 | A1* | 11/2009 | Laksono | H04N 21/2387 725/89 |
| 2010/0020224 | A1* | 1/2010 | Hattori | G06K 9/00221 348/333.11 |
| 2010/0129047 | A1* | 5/2010 | Tsunashima | H04N 21/44008 386/278 |
| 2013/0077939 | A1* | 3/2013 | Yamazaki | H04N 5/44513 386/244 |
| 2015/0067516 | A1* | 3/2015 | Park | G06F 3/167 715/728 |
| 2015/0172540 | A1* | 6/2015 | Tomita | H04N 5/783 386/241 |
| 2017/0062005 | A1* | 3/2017 | Kolesnikov | G11B 27/005 |

\* cited by examiner

IMAGE DISPLAYING APPARATUS AND IMAGE DISPLAYING METHOD

BACKGROUND OF THE INVENTION

1. Field of the Invention

The present invention relates to an image displaying apparatus and an image displaying method, and more particularly, to an image displaying apparatus and an image displaying method capable of automatically adjusting a displaying speed according to content of video data.

2. Description of the Prior Art

An image recording apparatus usually stores a long-term monitoring video, and the monitoring video is replayed when something worse happened for finding out information in detail. To give an example, as a burglary happened in the factory, all the monitoring video has to be replayed to search a burglar because nobody knows what time the burglar breaks into the factory. The image recording apparatus can store the monitoring video more than ten hours, and the burglary may spend few minutes breaking into the factory. Thus, a method of rapidly replaying the monitoring video for increasing the searching efficacy is an important issue in the image identification industry.

The conventional video rapidly replaying method analyzes each image frame of the monitoring video, and may utilize contour identification or pixel variation analysis to determine whether an object moves into a monitoring region of the image replaying apparatus. The monitoring video is replayed via a high speed in response to nothing identified, and is replayed via an original speed or a low speed in response to something identified. The conventional video rapidly replaying method cannot provide preferred computation efficiency due to huge data computation. In addition, another conventional video rapidly replaying method sets a region of interest within the image frame; for example, the region of interest may correspond to a door of the factory within the image frame. The conventional image replaying method analyzes each image frame to check whether an object moves into the region of interest. The monitoring video is replayed via the high speed in response to nothing entering the region of interest, and is replayed via the original speed or the low speed in response to something entering the region of interest. The second conventional video rapidly replaying method may have the computation efficiency better than ones of the first conventional video rapidly replaying method; however, both the conventional video rapidly replaying methods adjust the monitoring video via the single speed, and cannot adjust several parts of the monitoring video via respective speeds.

SUMMARY OF THE INVENTION

The present invention provides an image displaying apparatus and an image displaying method capable of automatically adjusting a displaying speed according to content of video data for solving above drawbacks.

According to the claimed invention, an image displaying method capable of automatically adjusting a displaying speed according to content of video data is disclosed. The image displaying method includes acquiring the video data containing a first group of images and a second group of images, acquiring a first time difference between a first beginning image frame of the first group of images and a second beginning image frame of the second group of images, comparing the first time difference with a predetermined threshold value, and adjusting the displaying speed of the first group of images in accordance with a comparison result. Each group of images is consisted of a beginning image frame and at least one non-beginning image frame.

According to the claimed invention, an image displaying apparatus electrically connected with a network apparatus to receive video data from the network apparatus is disclosed. The image displaying apparatus includes a screen and an operating processor. The screen is adapted to display the video data. The operating processor is electrically connected with the screen and adapted to acquire the video data containing a first group of images and a second group of images, acquire a first time difference between a first beginning image frame of the first group of images and a second beginning image frame of the second group of images, compare the first time difference with a predetermined threshold value, and adjust the displaying speed of the first group of images in accordance with a comparison result, for automatic adjustment of the displaying speed according to content of the video data. Each group of images is consisted of a beginning image frame and at least one non-beginning image frame.

The image displaying apparatus and the image displaying method of the present invention can adjust the displaying speed according to a time length of each group of images, and the time length of the group of images is equal to time difference between the beginning image frame of the current group of images and the beginning image frame of the next group of images. The video data can have the plurality of groups of images. The image displaying method can compute the time length of each group of images to provide the individual displaying speed, or can generate the displaying speed suitable for the adjacent groups of images due to the time lengths of all the adjacent groups of images. Comparing to the prior art which may set a region of interest within the image frame or analyze the full image frame to determine the displaying speed, the present invention can adjust the displaying speed of the current group of images by computing the time difference between the current group of images and the adjacent group of images, for providing preferred computation efficiency and effectively distinguishing the important image from the unimportant images, so as to automatically adjust the displaying speed according to specific group of images within the video data.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
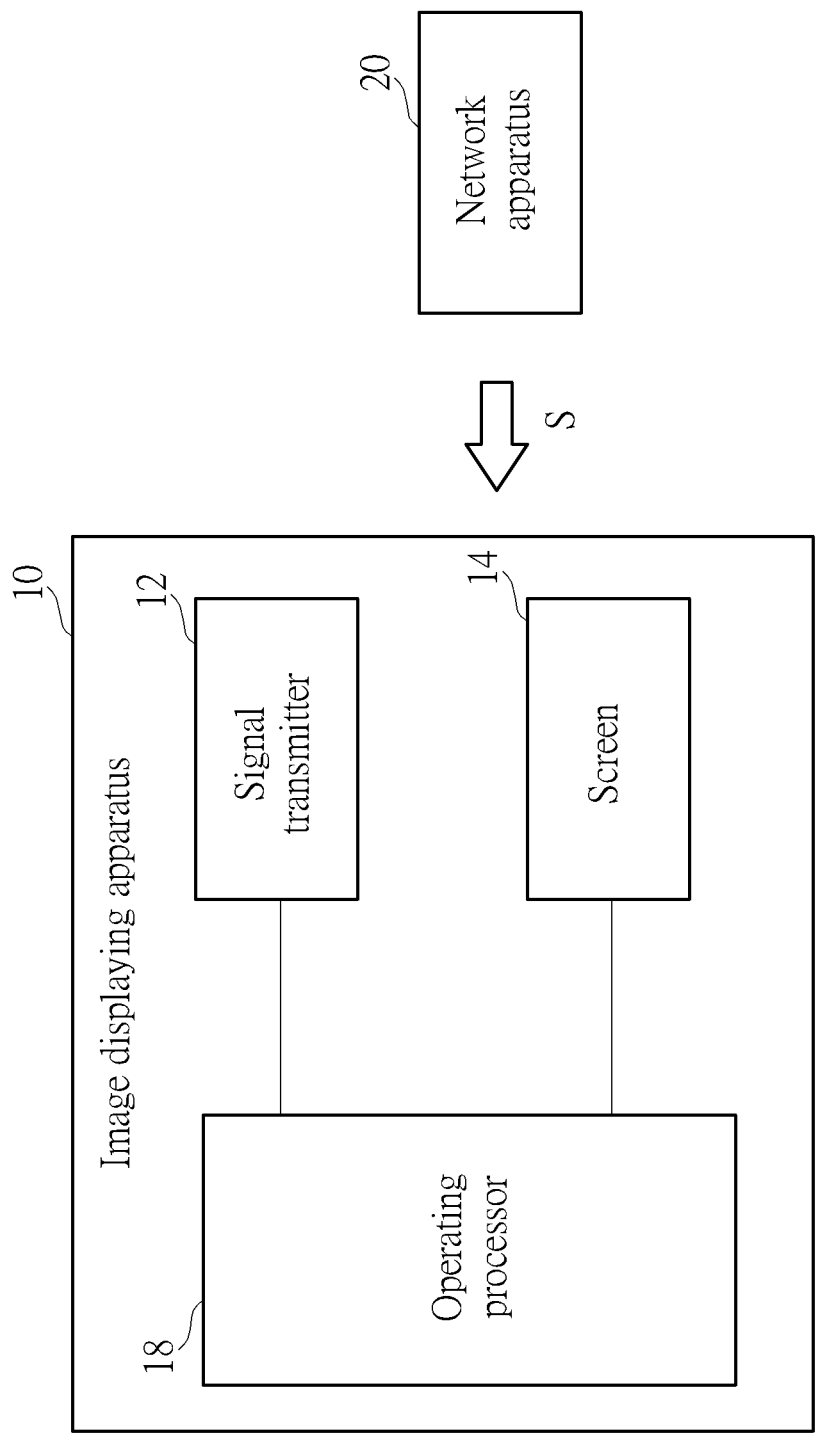
FIG. 1 is a functional block diagram of an image displaying apparatus according to an embodiment of the present invention.
Figure 2:
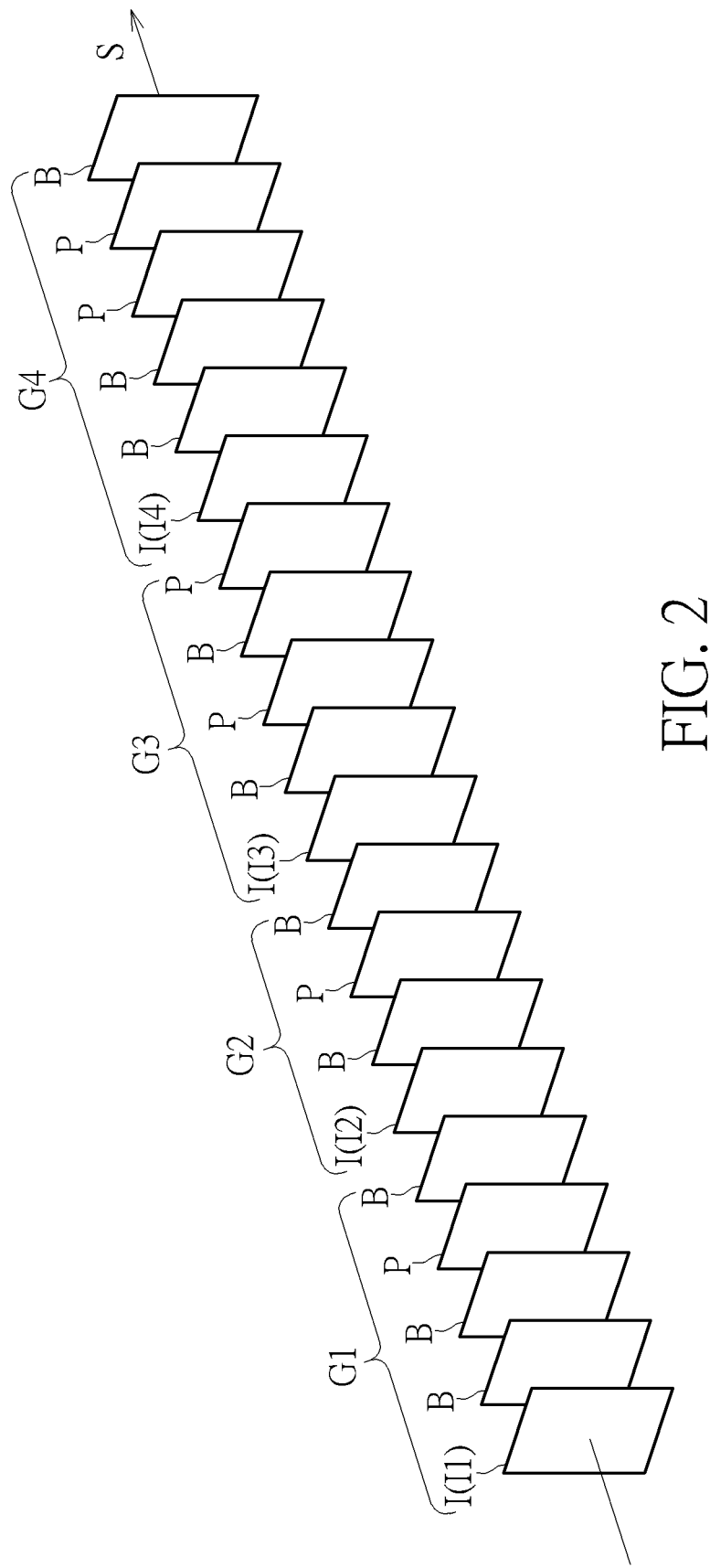
FIG. 2 is a diagram of a video data displayed by the image displaying apparatus according to the embodiment of the present invention.
Figure 3:
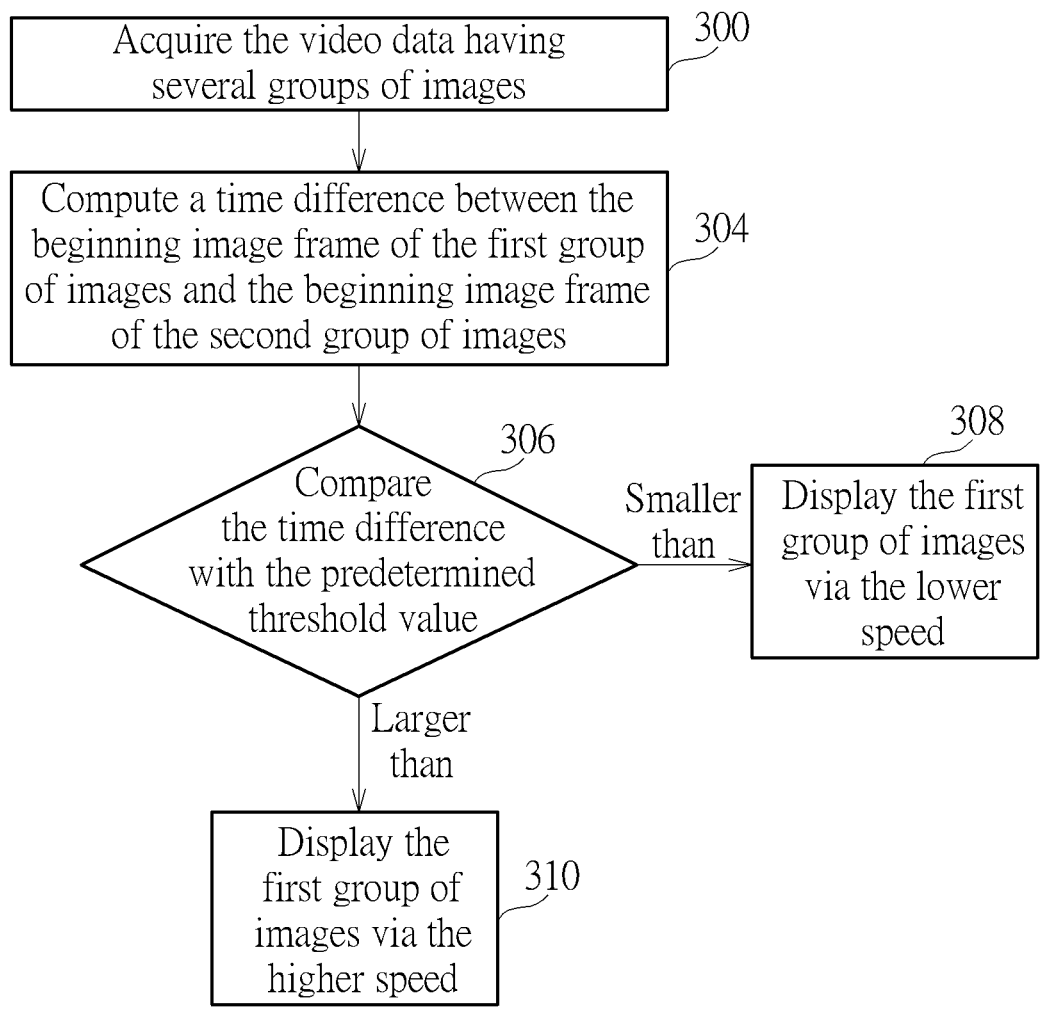
FIG. 3 is a flowchart of an image displaying method according to the embodiment of the present invention.

Please refer to FIG. 1 to FIG. 3. FIG. 1 is a functional block diagram of an image displaying apparatus 10 according to an embodiment of the present invention. FIG. 2 is a diagram of a video data S displayed by the image displaying apparatus 10 according to the embodiment of the present invention. FIG. 3 is a flow chart of an image displaying method according to the embodiment of the present invention. The image displaying apparatus 10 can include a signal transmitter 12, a screen 14 and an operating processor 18 electrically connected with each other. The image displaying apparatus 10 is a device capable of displaying the video data, such as a personal computer or a video management system. An image transmission channel is established between the image displaying apparatus 10 and an external network apparatus 20. The video data S can be generated by the network apparatus 20, or can be transferred from another source via the network apparatus 20. The network apparatus 20 is a device capable of transmitting the video data, such as a surveillance camera or a network video recorder. The operating processor 18 can drive the signal transmitter 12 to receive the video data S, and the video data S can be displayed on the screen 14. A displaying speed of the video data S can be adjusted in accordance with content of the video data S so as to omit the unvaried content or the slightly-varied content when the video data S is displayed by the image displaying apparatus 10. The video data S can be displayed via a normal speed to avoid missing important image in response to the content having obvious variation.

The video data S of the network apparatus 20 can be compressed as dynamic group of pictures (DGOP). The video data S can include several groups of images, such as a first group of images G1, a second group of images G2, a third group of images G3 and a fourth group of images G4. An amount of image frames about the foresaid groups of images may be different from each other due to content variation of the video data S. Each group of images can include the beginning image frame I and the non-beginning image frame B or the non-beginning image frame P. The DGOP algorithm is disclosed in Taiwan patent no. TW I554083. The beginning image frame I can be the intra-frame (I-Frame) generated by intra-frame compression for storing complete image content. The non-beginning image frame B and the non-beginning image frame P are generated by inter-frame compression to store content of the image related to the adjacent ones. The non-beginning image frame B may be the bi-directional frame (B-Frame) which establishes dynamically predictive compensation code by referring to the previous and following frames in a two-way manner. The non-beginning image frame P may be the predictive frame (P-Frame) referred by the previous displayed image frame. Therefore, the group of images with variable content has less amount of the image frame.

As an example of the first group of images G1 and the second group of images G2, step 300 and step 304 are executed to connect the network apparatus 20 for acquiring the video data S having the groups of images G1, G2, G3 and G4, and acquire a first time difference between a first beginning image frame I1 of the first group of images G1 and a second beginning image frame I2 of the second group of images G2. Then, step 306 is executed to compare the first time difference with a predetermined threshold value. Step 308 can be executed when the first time difference is smaller than the predetermined threshold value, and the first group of images G1 is displayed via the lower first speed. Step 310 can be executed when the first time difference is greater than the predetermined threshold value, and the first group of images G1 is displayed via the higher second speed. The first time difference having a small value can represent content of the first group of images G1 is variable, so that the first group of images can be displayed via the slow speed or the normal speed. The first time difference having a large value can represent content of the first group of images G1 is nearly invariable, and the first group of images can be displayed via the high speed for increasing searching efficiency.

In step 304, the image displaying apparatus 10 can connect the network apparatus 20 to search the stored video data S when the video data S is prepared to display, and then compute the first time difference in accordance with the video data S to comparing the first time difference with the predetermined threshold value. Further, the network apparatus 20 may store the video data S and compute the first time difference according to the video data S at the same time, therefore the video data S and the first time difference can be both stored into the network apparatus 20; the image displaying apparatus 10 can rapidly acquire the stored video data S and the stored first time difference when connecting the network apparatus 20. The former of the foresaid applications can compute time difference between the beginning image frames of different groups of images in real time when displaying the video data S. The later application can compute the time difference when storing the video data S. The present invention is not limited to the above-mentioned applications, and depends on design demand.

Figure 4:
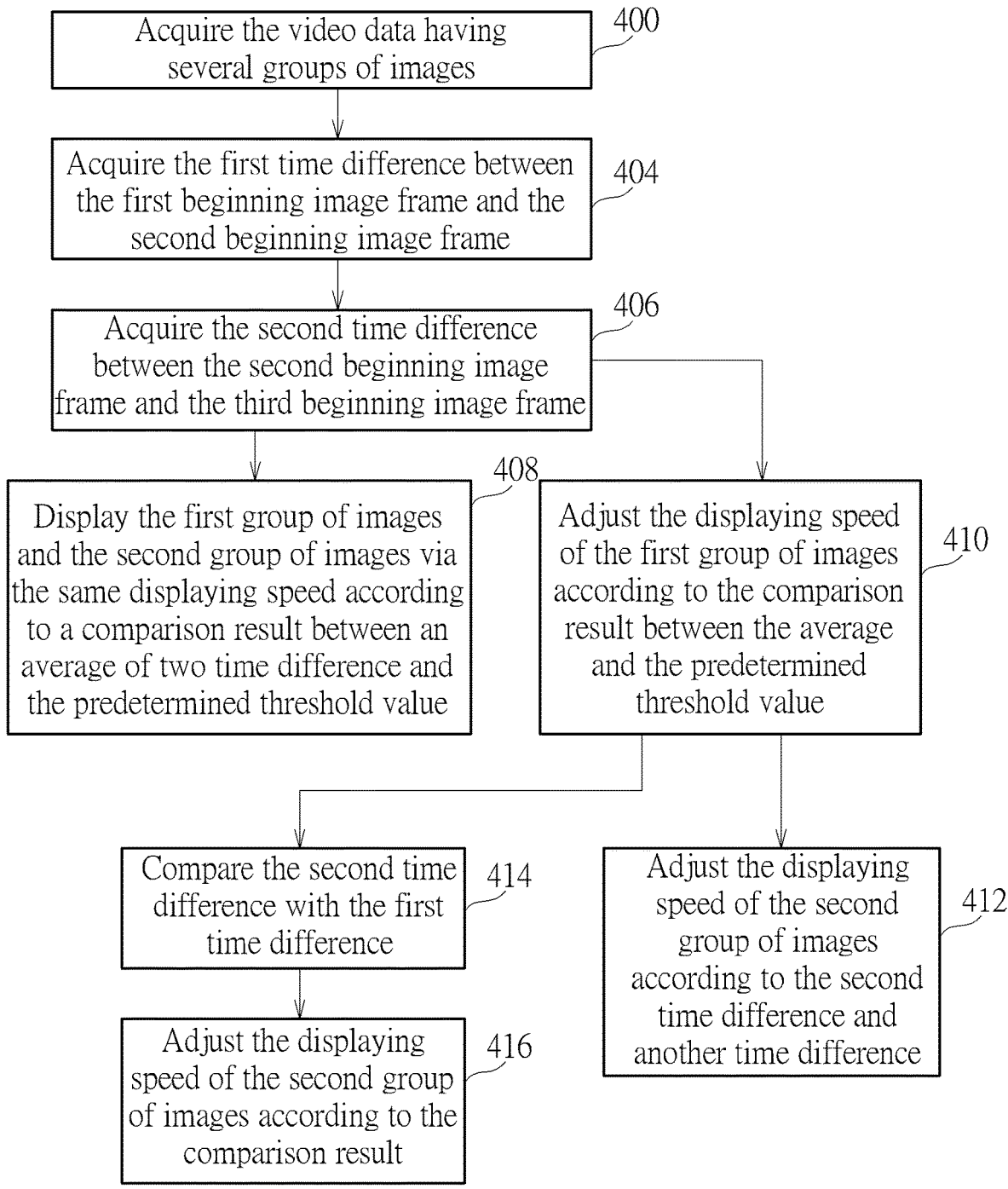
FIG. 4 is a flowchart of the image displaying method according to another embodiment of the present invention.

Please refer to FIG. 4. FIG. 4 is a flow chart of the image displaying method according to another embodiment of the present invention. Step 400 is executed to connect the network apparatus 20 for acquiring the video data S with the groups of images G1, G2, G3 and G4. Then, step 404 and step 406 are executed to acquire the first time difference between the first beginning image frame I1 and the second beginning image frame I2 and a second time difference between the second beginning image frame I2 and a third beginning image frame I3 of the third group of images G3, and then compute an average of the first time difference and the second time difference accordingly. Step 408 is an optional procedure executed in accordance with the user's habit. Step 408 is executed to display the first group of images G1 and the second group of images G2 via the same displaying speed, and the same displaying speed can be the high speed or the low speed determined by a comparison result between the average and the predetermined threshold value. Besides, step 410 and step 412 can be optionally executed to adjust the displaying speed of the first group of images G1 according to the comparison result between the average and the predetermined threshold value, and further adjust the displaying speed of the second group of images G2 according to the second time difference and another time difference (such as a third time difference between the third beginning image frame I3 and a fourth beginning image frame I4).

In step 412, the image displaying method can only compare the second time difference with the predetermined threshold value for determining the displaying speed of the second group of images G2, or the image displaying method may acquire the third time difference between the third beginning image frame I3 and the fourth beginning image frame I4 of the fourth group of images G4 for computing an average of the second time difference and the third time difference, so as to adjust the displaying speed of the second group of images G2 according to the average. The present invention provides two solutions individually aimed at displaying fluency and watching comfort. In step 408, the continuous groups of images can be displayed via the same displaying speed for preferred comfort. In step 410 and step 412, the groups of images are respectively displayed via different displaying speed; when the large time difference between the adjacent groups of images exists, the important image can be effectively identified and displayed via the low speed, and the unimportant image can be displayed via the high speed for omission.

Moreover, the image displaying method may not compute the average of different time difference after execution of step 410, and step 414 and step 416 can be executed to compare the second time difference with the first time difference. The first group of images G1 and the second group of images G2 can be displayed via the same displaying speed in response to small difference between the second time difference and the first time difference. When the second time difference is much different from the first time difference, the displaying speed of the second group of images G2 can be increased or decreased according to a difference quantity between the second time difference and the first time difference. Any adjustment of the displaying speed of each group of images being directly proportional to the time difference between the beginning image frame of the current group of images and the beginning image frame of the next group of images belongs to a scope of the present invention. The adjustment of the displaying speed can be referred by the following formula 1. First, an absolute value about the difference between an interval of I frames and a first parameter A1 is acquired, and then a sum of the absolute value and a second parameter A2 to the power of n (which is a predefined numeral) is acquired, so as to generate a ratio V of the adjusted displaying speed to an initial displaying speed of the video data S. The first parameter A1 and the second parameter A2 are positive integers. For instance, the time different is three seconds in response to the original displaying speed, and the time different is four seconds in response to four times the displaying speed, and the time difference is ten seconds in response to sixty-four times the displaying speed. Large time difference between the former group of images and the latter group of images may represent that content of the former group of images is invariable or slightly variable, so that the former group of images can be displayed via the high speed for omission.

$$(|I\ frame\ interval - A1| + A2)^n = V \qquad \text{Formula 1}$$

In conclusion, the image displaying apparatus and the image displaying method of the present invention can adjust the displaying speed according to a time length of each group of images, and the time length of the group of images is equal to time difference between the beginning image frame of the current group of images and the beginning image frame of the next group of images. The video data can have the plurality of groups of images. The image displaying method can compute the time length of each group of images to provide the individual displaying speed, or can generate the displaying speed suitable for the adjacent groups of images due to the time lengths of all the adjacent groups of images. Comparing to the prior art which may set a region of interest within the image frame or analyze the full image frame to determine the displaying speed, the present invention can adjust the displaying speed of the current group of images by computing the time difference between the current group of images and the adjacent group of images, for providing preferred computation efficiency and effectively distinguishing the important image from the unimportant images, so as to automatically adjust the displaying speed according to specific group of images within the video data.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image displaying method capable of automatically adjusting a displaying speed according to content of video data, the image displaying method comprising:
   acquiring the video data containing a first group of images and a second group of images and a third group of images, wherein each group of images is consisted of a beginning image frame and at least one non-beginning image frame;
   acquiring a first time difference between a first beginning image frame of the first group of images and a second beginning image frame of the second group of images;
   acquiring a second time difference between the second beginning image frame and a third beginning image frame of the third group of images;
   computing an average of the first time difference and the second time difference;
   comparing the average with a predetermined threshold value; and
   adjusting the displaying speed of the first group of images according to a comparison result between the average and the predetermined threshold value.

2. The image displaying method of claim 1, wherein the first group of images is displayed via a first speed in response to the first time difference smaller than the predetermined threshold value and further displayed via a second speed in response to the first time difference greater than the predetermined threshold value, the first speed is smaller than the second speed.

3. The image displaying method of claim 1, wherein acquiring the video data containing the first group of images and the second group of images comprises:
   connecting a network apparatus to acquire the video data, wherein the network apparatus stores the video data and the first time difference.

4. The image displaying method of claim 1, wherein the image displaying method further comprises:
   displaying the first group of images and the second group of images by the same displaying speed according to the comparison result between the average and the predetermined threshold value.

5. The image displaying method of claim 1, wherein the image displaying method further comprises:
   computing the displaying speed of the second group of images according to the second time difference.

6. The image displaying method of claim 5, wherein computing the displaying speed of the second group of images according to the second time difference comprises:
   comparing the first time difference with the second time difference; and
   adjusting the displaying speed of the second group of images according to a comparison result.

7. The image displaying method of claim 5, wherein the video data further contains a fourth group of images, computing the displaying speed of the second group of images according to the second time difference comprises:
   acquiring a third time difference between the third beginning image frame and a fourth beginning image frame of the fourth group of images;
   computing an average of the second time difference and the third time difference; and
   adjusting the displaying speed of the second group of images according to the average.

8. The image displaying method of claim 1, wherein an absolute value of difference between the first time difference and a first parameter is acquired, a sum of the absolute value and a second parameter to the power of a predefined numeral is a ratio of the adjusted displaying speed to an initial displaying speed of the video data, and the first parameter and the second parameter are positive integers.

9. The image displaying method of claim 1, wherein the displaying speed is directly proportional to the first time difference.

10. An image displaying apparatus electrically connected with a network apparatus to receive video data from the network apparatus, the image displaying apparatus comprising:
  a screen adapted to display the video data; and
  an operating processor electrically connected with the screen and adapted to acquire the video data containing a first group of images and a second group of images and a third group of images, acquire a first time difference between a first beginning image frame of the first group of images and a second beginning image frame of the second group of images, acquire a second time difference between the second beginning image frame and a third beginning image frame of the third group of images, compute an average of the first time difference and the second time difference, compare the average with a predetermined threshold value, and adjust the displaying speed of the first group of images according to a comparison result between the average and the predetermined threshold value, for automatic adjustment of the displaying speed according to content of the video data;
  wherein each group of images is consisted of a beginning image frame and at least one non-beginning image frame.

11. The image displaying apparatus of claim 10, wherein the first group of images is displayed via a first speed in response to the first time difference smaller than the predetermined threshold value and further displayed via a second speed in response to the first time difference greater than the predetermined threshold value, the first speed is smaller than the second speed.

12. The image displaying apparatus of claim 10, wherein the operating processor is further adapted to connect a network apparatus to acquire the video data, and the network apparatus stores the video data and the first time difference.

13. The image displaying apparatus of claim 10, wherein the operating processor is further adapted to display the first group of images and the second group of images by the same displaying speed according to the comparison result between the average and the predetermined threshold value.

14. The image displaying apparatus of claim 10, wherein the operating processor is further adapted to compute the displaying speed of the second group of images according to the second time difference.

15. The image displaying apparatus of claim 14, wherein the operating processor is further adapted to compare the first time difference with the second time difference, and adjust the displaying speed of the second group of images according to a comparison result.

16. The image displaying apparatus of claim 14, wherein the video data further contains a fourth group of images, the operating processor is further adapted to acquire a third time difference between the third beginning image frame and a fourth beginning image frame of the fourth group of images, compute an average of the second time difference and the third time difference, and adjust the displaying speed of the second group of images according to the average.

17. The image displaying apparatus of claim 10, wherein an absolute value of difference between the first time difference and a first parameter is acquired, a sum of the absolute value and a second parameter to the power of a predefined numeral is a ratio of the adjusted displaying speed to an initial displaying speed of the video data, and the first parameter and the second parameter are positive integers.

18. The image displaying apparatus of claim 10, wherein the displaying speed is directly proportional to the first time difference.

\* \* \* \* \*